July 4, 1967 K. P. SCHUBERT 3,329,248
CLUTCH OR BRAKE
Filed Oct. 11, 1965
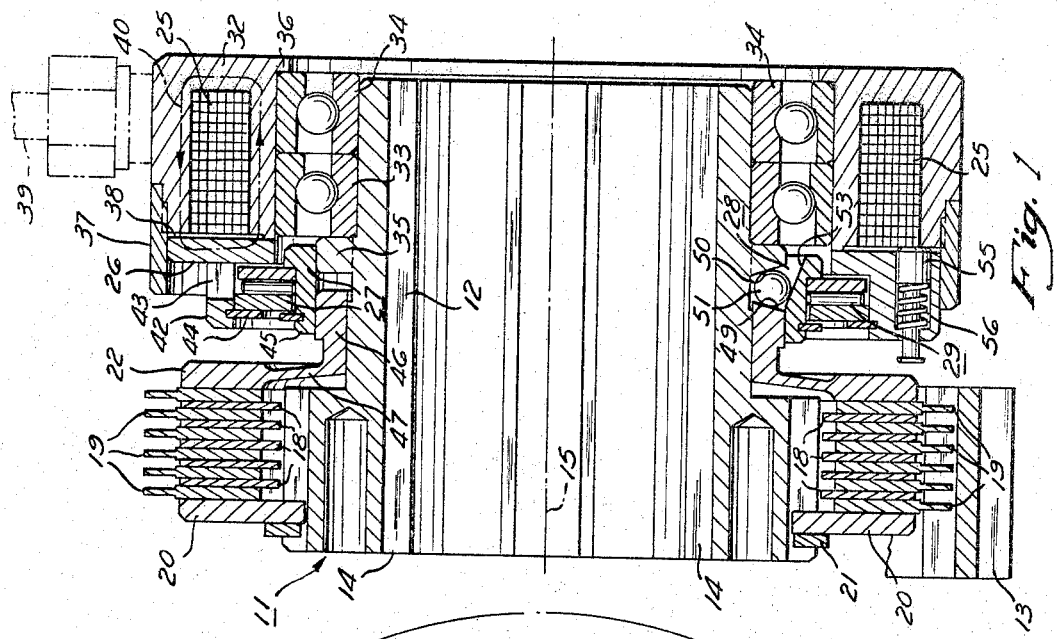
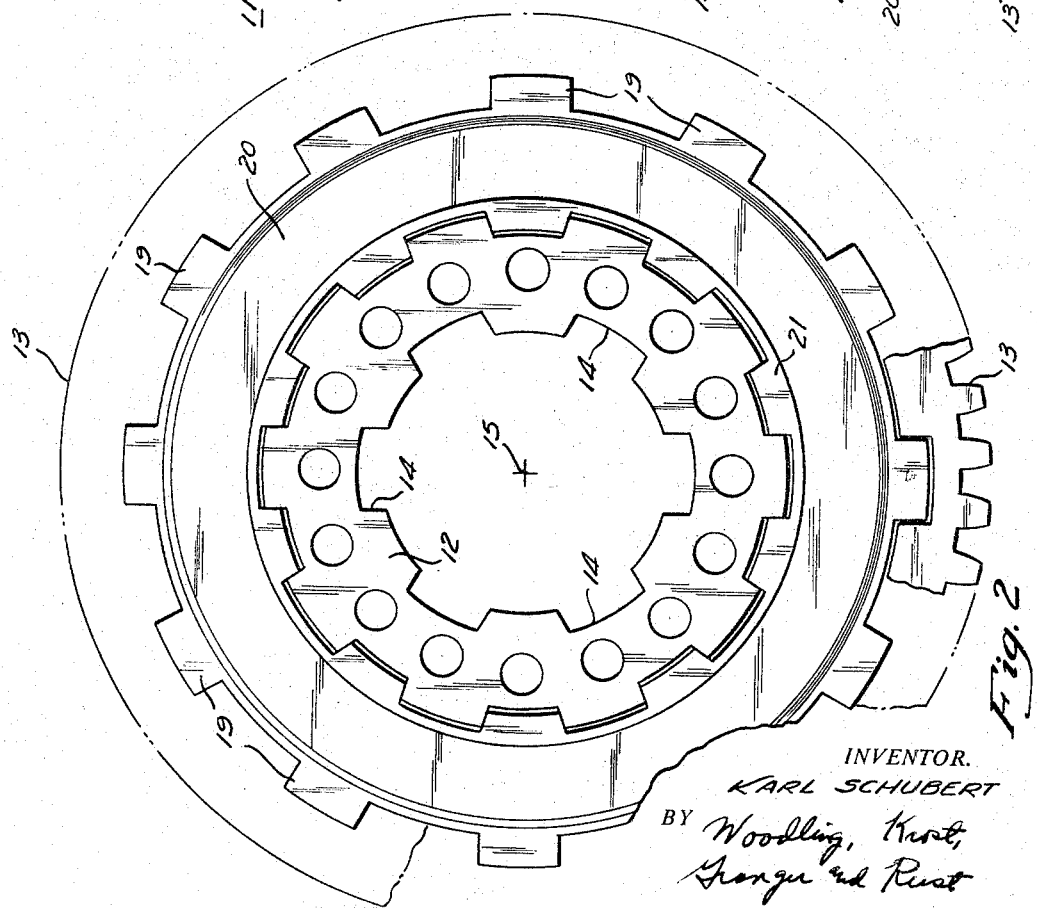
INVENTOR.
KARL SCHUBERT
BY Woodling, Krost,
Granger and Rust

United States Patent Office 3,329,248
Patented July 4, 1967

3,329,248
CLUTCH OR BRAKE
Karl P. Schubert, Cleveland Heights, Ohio, assignor to The National Acme Company, a corporation of Ohio
Filed Oct. 11, 1965, Ser. No. 494,630
20 Claims. (Cl. 192—84)

The invention relates in general to clutch or brake mechanisms and more particularly to such a mechanism which is electrically operated and has a mechanical advantage.

In clutch or brake units heretofore manufactured it has usually been found that fluid operated clutches are capable of clutching or braking about two to three times the torque in foot pounds than electrically operated clutches for the same diameter. This has limited the use of electric clutches. One reason for this low torque output of electric clutches is that where the electric coil is stationary, that is non-rotating, in order to eliminate slip rings and brushes for electrical connection to the coil, the magnetic flux must usually traverse two air gaps. This limits the effective amount of magnetic pull on the armature associated with the electric coil. Another reason is that in many prior art clutches the magnetic flux must flow through several plates of a multiple disc clutch. These multiple discs are used in order to increase the frictional area of the clutch without increasing the diameter. However, having the magnetic flux traverse these plates, means that the plates must be magnetically permeable and this limits the selection of material for the plates so that the plates cannot always be selected for best flux conducing properties. Further many such prior art clutches have been difficult to release because of the magnetic attraction between the multiple discs or plates or because of centrifugal force.

Accordingly an object of the invention is to provide a clutch or brake obviating the above mentioned disadvantages.

Another object of the invention is to provide a clutch or brake with a non-rotatable coil to eliminate brushes or slip rings and to have a clutch with at least as much torque transmitting capability as a fluid operated clutch of the same diameter.

Another object of the invention is to provide an electric clutch of the non-rotating coil type wherein upon actuation there are substantially no air gaps in the magnetic circuit for efficient utilization of the electromagnetic energy.

Another object of the invention is to provide an electric clutch wherein the magnetic flux does not traverse the plates or discs of a multiple disc clutch, and accordingly the plates need not be magnetically permeable but may be chosen for good frictional characteristics.

Another object of the invention is to provide an electric clutch with a non-rotating coil and armature with the force of the armature transmitted through a thrust bearing to a rotating clutch or brake part.

Another object of the invention is to provide an electric clutch or brake with a non-rotating coil and armature and with the movement of the armature transmitted through a mechanical advantage means to increase the force on the movable clutch or brake part.

Another object of the invention is to provide a clutch or brake mechanism including a Belleville spring section to provide automatic wear compensation.

The invention may be incorporated in a clutch or brake having non-rotative coil means and having first and second parts relatively rotatable about an axis and to be selectively clutched together, non-rotative movable armature means mounted to be moved in a first direction upon energization of the coil means, linkage means connecting said armature means to said first clutch part to move said first clutch part to engage the clutch upon movement of said armature means in said first direction, said linkage means including mechanical advantage means to increase the force on said first clutch part, and said linkage means including thrust bearing means connected between said non-rotative armature means and said first clutch part to transmit the movement from said armature means to said first clutch part while permitting relative rotation therebetween.

Other objects and a fuller understanding of the invention may be had by referring to the following description and claims, taken in conjunction with the accompanying drawing in which:

FIGURE 1 is a longitudinal sectional view through a preferred embodiment of the invention; and, FIGURE 2 is an end view of the mechanism of FIGURE 1.

The figures of the drawing show a preferred embodiment of the invention but this drawing is only by way of illustration and the invention is limited only by the hereinafter appended claims.

FIGURES 1 and 2 show a clutch or brake mechanism 11 including generally a first shaft 12 and a gear 13. The shaft 12 may be hollow to increase the usefulness of the mechanism 11 and this shaft is shown with internal spline 14 for non-rotative connection to an internal shaft, not shown. The shaft 12 and gear 13 may be first and second parts of the clutch or brake mechanism 11 which are to be selectively clutched together. The two parts 12 and 13 are relatively rotatable about an axis 15. If the mechanism is to be used as a clutch, both parts 12 and 13 will be rotatable and if the mechanism is to be used as a brake, then one or the other of the parts 12 and 13 may be stationary.

A first and second group of plates 18 and 19, respectively, are interleaved and form part of a multiple friction plate or multiple disc clutch or brake. The first group of plates 18 are splined on the first shaft 12 and the second group of plates 19 are splined on the outer gear 13. These plates increase the frictional area of the mechanism 11 without increasing the diameter. An end ring 20 is splined to the shaft 12 and held in place by a snap ring 21 to serve as an axial stop for the plates 18 and 19. A clutch ring 22 is disposed at the other axial end of the interleaved plates 18 and 19 and is moved axially by a mechanism hereinafter described.

The clutch or brake mechanism 11 is actuated generally by an electrical coil 25, an armature 26, and linkage means 27 interconnecting the armature 26 and the clutch ring 22. This linkage means includes generally mechanical advantage means 28 and thrust bearing means 29.

More specifically the electrical coil 25 is a toroidal coil mounted coaxially on the mechanism 11. It is partially enclosed in a stator core 32 and maintained in coaxial alignment by bearings 33 and 34. These bearings are combined radial and thrust bearings and bearing 33 has an inner race engaging a shoulder 35 on the shaft 12. Bearing 34 abuts bearing 33 and has an outer race engaging a shoulder 36 on the stator core 32. This construction permits transmission of axial thrust of the stator core 32 to the left relative to the shaft 12. Further it definitely positions the stator core 32 relative to the sleeve 12. The stator core has pole faces 38 which cooperate with and attract the armature 26. The electrical coil 25 and stator core 32 are stationary or at least non-rotative, so that an electrical connection 39 to this coil 25 may easily be made without using slip rings and brushes.

The armature 26 is mounted for longitudinal sliding movement in a non-magnetic sleeve 37. The armature 26 may have approximately ⅛" stroke for disengaged to engaged positions of the clutch. The armature 26 may engage the pole faces 38, and if so it is preferable that the engaging surface be of non-magnetic material such as being chromium plated, either on the pole faces or preferably on the armature. This prevents sticking of the armature 26 to the pole faces upon deenergization of the coil. Alternatively a small air gap may be maintained at the pole faces, for example, .005″ at the engaged position of the clutch. This small air gap will be achieved by the dimensions of the various parts in the linkage means 27. The chromium plating in the alternative design is in effect an air gap to prevent sticking. The armature 26 is also non-rotative and is axially movable to the right to engage or lie close to the pole faces 38 upon energization of the coil 25. This engagement provides a very low reluctance flux path 40 with stationary substantially closed air gaps and maximum utilization of electrical energy and maximum magnetic pull to the right on the armature 26.

A ring or pull sleeve 42 is connected to the exposed side of the armature 26 by fingers 43. The use of these fingers 43 prevents loss of magnetic flux into parts other than the prescribed path through the stator core 32 and armature 26. The thrust bearing means 29 in this preferred embodiment is a needle bearing to conserve axial space. This thrust bearing means 29 is fastened to the ring 42 by a snap ring 44. The needle bearing means 29 has first and second races with one race engaging the snap ring 44 and the second race engaging an axial shoulder on a cam sleeve or cam member 45. This cam member 45 is a part of the mechanical advantage means 28. Other parts of this means 28 include a thrust ring or member 46 and a thrust body which may be the shoulder 35. This thrust body 35 is fixed to or a part of the shaft 12. The thrust ring 46 is connected to the clutch ring 22 by a Belleville spring section 47.

Conical surface means are provided on the facing surfaces of at least one of the thrust ring 46 and thrust body 35. These conical surface means may take the form of conical recesses 49 and 50, in the thrust ring 46 and thrust body 35, respectively. Thrust balls or bearings 51 are disposed in these conical recesses. These conical surface means may be individual conical pockets to contain only one ball in each pocket between the thrust ring 46 and the thrust body 35, or the conical surface means may be a single conical surface on the thrust ring 46 or a single conical surface on the thrust body 35, each having the apex and the axis of the cone along the axis 15. In either case the conical surface means provide a recess for the plurality of balls 51 which conical surface means becomes progressively narrower in one radial direction. In the illustration shown this is in a radially inward direction. The cam sleeve 45 has a longitudinally tapering cam surface 53 to coact with the thrust balls 51. The thrust balls 51 are rollable members and may be cylindrical in many cases for increased surface contact area and it is to be understood that the term thrust balls used hereinafter in the specification and claims includes both spheres and cylinders and other rollable elements.

A plurality of plungers 55 biased to the right by spring 56 are carried in the ring 42 to aid release of the armature 26 upon deenergization of the coil 25. For assembly, the shoulder 35 and thrust ring 46 may be splined so that the clutch ring may be slid over from the right end of shaft 12 and then rotated half the width of the splines to interlock the two parts. The balls 51 may then be inserted into the conical recesses 49 and 50 to keep the parts 35 and 46 relatively non-rotative. Alternatively, the shoulder 35 may be made separate from the shaft 12 and axially fastened in place.

*Operation*

The clutch or brake mechanism 11 has the relatively rotatable parts 12 and 13 which are to be selectively clutched together. Stationary or non-rotatable coil 25 magnetically pulls the armature 26 to the right as viewed in FIGURE 1. Linkage means 27 interconnects the armature 26 and the clutch ring 22 to actuate the mechanism to clutch the parts 12 and 13 together. This linkage means 27 includes generally the mechanical advantage means 28 and the thrust bearing means 29. The movement to the right of the armature 26 moves the cam sleeve 45 to the right by means of the thrust bearing 29. The armature 26 and ring 42 do not rotate but the cam sleeve 45 does rotate and accordingly this thrust bearing 29 permits this relative rotation. The mechanical advantage means 28 includes generally the cam sleeve 45, the thrust ring 46, and the thrust body 35 as well as the thrust balls 51. The longitudinally tapering cam surface 53 may be an individual conical surface for each ball 51 or it may be provided by a single conical surface having the apex and axis on the axis 15. Having individual conical recesses 49 and 50 at an individual tapering cam surface 53 and cooperating with each thrust ball 51 assures that all three members 35, 45, and 46 will rotate together in synchronism.

Movement to the right of the cam sleeve 45 causes the tapering cam surface 53 to act on the balls 51. This forces them radially inwardly and the conical surface means 49 and 50 cause the thrust ring 46 to move to the left as viewed in FIGURE 1. This moves the clutch ring 22 to the left to engage the clutch or brake mechanism 11 by clutching together the parts 12 and 13. The Belleville spring section 47, formed integrally with the clutch ring 22 and thrust ring 46, provides a measure of automatic wear compensation and to assure that the mechanism 11 is fully engaged when the armature 26 seats on the pole faces 38.

The fact that both the armature 26 and the stator core 32 are non-rotating units means that the magnetic flux in the path 40 may be completely utilized for magnetic pull on the armature 26. In many prior art units where the armature and stator were rotatable, two air gaps of 1/32 of an inch or larger had to be provided in order to prevent these parts from rubbing on each other should any warping or expansion develop from heat or wear. This relatively large air gap of about .030″ and the fact that there are two such air gaps seriously limited the available torque in many prior art electric clutches or brakes. Also it is to be noted that the magnetic flux path 40 does not flow through the first and second group of plates 18 and 19. In many prior art electric clutches this flux path passed through these groups of plates. Such construction meant that these plates had to be magnetically permeable, for example steel plates. This had four distinctive disadvantages. One is that if both groups of plates were made of the same material then galling of the metal contact surfaces frequently resulted. The second was that the plates were magnetically attracted together and the residual magnetic attraction prevented easy release of the clutch when the coil was deenergized. Third, using magnetically permeable plates meant that the material of the plates could not be selected for best friction characteristics. Fourth, the contact surfaces of the plates generally had to be planar in order to establish an efficient flux path and this also prevented easy release of the clutch upon deenergization. In the present invention preferably one group of plates is made of steel and the other group of plates is made from a sintered beryllium alloy. Also radial grooves are placed in the plates and both the material and the plate configuration aid release of the clutch promptly upon deenergization of the coil 25. This is most important in many applications including those in machine tools where machine cycle times are becoming increasingly shorter and quick action and especially quick release clutches are required.

The longitudinally tapering cam surface 53 may be disposed at a 20 degree angle, for example, and the conical recesses 49 and 50 may each be disposed at a 15 degree angle relative to a normal to the axis 15, for example. These angles will prevent a locking taper yet will provide an over-all mechanical advantage of in excess of 5:1. In one specific example the clutch plates had an effective outside diameter of about 5.5″ and an effective inside diameter of 4.25″, 11 plates were used and yet the clutch developed an output practical torque of about 285 foot pounds with a 400 ampere-turn winding.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts and steps may be resorted to without departing from the spirit and the scope of the invention as hereinafter claimed.

What is claimed is:

1. In an electrically operated clutch or brake mechanism having non-rotative coil means and having first and second parts relatively rotatable about an axis and to be selectively clutched together,
the provision of,
non-rotative movable armature means mounted to be moved in a first direction upon energization of the coil means,
linkage means connecting said armature means to said first part to move said first part to engage the mechanism upen movement of said armature means in said first direction,
said linkage means including mechanical advantage means to increase the force on said first part,
and said linkage means including thrust bearing means connected between said non-rotative armature means and said first part to transmit the movement from said armature means to said first part while permitting relative rotation therebetween.

2. A mechanism as claimed in claim 1 wherein said mechanical advantage means includes a cam member and a thrust member with the cam member moved by said armature means.

3. A mechanism as claimed in claim 1 wherein said armature means, mechanical advantage means and thrust bearing means are coaxial about the axis.

4. A mechanism as claimed in claim 1 wherein said mechanical advantage means includes a thrust body, thrust member, and cam member,
ball-receiving conical surface means between said thrust body and thrust member being progressively narrower in one direction,
thrust balls disposed between said thrust member and said thrust body conical surface means to be acted on by said cam member to move said thrust member,
and means connecting said thrust member to move said first part.

5. A mechanism as claimed in claim 1 wherein said armature means is coaxial and is axially movable,
and said mechanical advantage means includes a coaxial and axially movable cam member.

6. A mechanism as claimed in claim 1 including core means cooperating with said coil means to establish part of a flux path for said coil means,
pole face means on said core means to cooperate with said armature means,
first and second groups of interleaved friction plates connected to said first and second parts, respectively,
and said armature means cooperating with said coil means to engage said pole face means to provide a substantially closed flux path through said core means excluding said friction plates.

7. A mechanism as claimed in claim 1, including a Belleville spring section in said linkage means to partially compensate for wear.

8. In an electrically operated clutch or brake mechanism having non-rotative coil means and having first and second parts relatively rotatable about an axis and to be selectively clutched together,
non-rotative movable armature means mounted to be moved in a first direction upon energization of the coil means,
mechanical advantage means including a cam member moved by said armature means and including a thrust member,
a cam surface on said cam member acting to move said thrust member with a mechanical advantage,
means connecting said thrust member to said first part for movement of said first part to engage said mechanism upon movement of said armature means in said first direction,
and thrust bearing means connected between said non-rotative armature means and said first part to transmit the force from said armature means to said first part while permitting relative rotation therebetween.

9. In a clutch or brake mechanism having first and second parts relatively rotatable about an axis and to be selectively clutched together,
non-rotative coil means,
core means cooperating with said coil means and having pole face means,
movable and non-rotative armature means mounted to be attracted in said pole face means upon energization of said coil means,
mechanical advantage means including a cam member moved by said armature means in a first direction and including athrust member,
a cam surface on said cam member acting on said thrust member upon movement of said cam member in said first direction to move said thrust member with a mechanical advantage,
means connecting said thrust member to said first part for movement of said first part to engage said mechanism upon energization of said coil means,
and thrust bearing means connected between said non-rotative armature means and said first part to transmit the force from said armature means to said first part while permitting relative rotation therebetween.

10. In a clutch or brake mechanism having first and second parts relatively rotatable about an axis and to be selectively clutched together,
non-rotative coil means,
stator core means cooperating with said coil means and having pole face means,
movable and non-rotative armature means mounted to be attracted to said pore face means upon energization of said coil means,
mechanical advantage means including a cam member moved by said armature means,
a thrust body and thrust member in said mechanical advantage means,
said thrust body and thrust member being relatively movable,
a cam surface on said cam member acting to relatively move said thrust member and thrust body with a mechanical advantage,
means connecting said first part for movement to engage said mechanism upon energization of said coil means and consequent relative movement of said thrust body and thrust member,
and thrust bearing means connected between said non-rotative armature means and said first part to transmit the force from said armature means to said first part while permitting relative rotation therebetween.

11. In a clutch or brake mechanism having first and second parts relatively rotatable about an axis and to be selectively clutched together,
stationary coil means,
stator core means cooperating with said stationary coil means and having pole face means,
axially movable and non-rotative armature means mounted to be attracted to said pole face means upon energization of said coil means,
mechanical advantage means including a cam member moved by said armature means in a first axial direction,
a thrust body and thrust member in said mechanical advantage means,
said thrust body and thrust member being relatively axially movable,
ball-receiving conical surface means between said thrust body and thrust member being progressively narrower in one generally radial direction,
thrust balls disposed between said thrust member and said thrust body ball-receiving conical surface means,
a longitudinally tapered cam surface on said cam member acting on said thrust balls to force said balls in said one generally radial direction upon movement of said cam member in said first axial direction to relatively move said thrust member and thrust body with a mechanical advantage,
means connecting said first part for movement to engage said mechanism upon energization of said coil means and consequent relative axial movement of said thrust body and thrust member,
and thrust bearing means connected between said non-rotative armature means and said first part to transmit the force from said armature means to said first part and to permit relative rotation therebetween.

12. In a clutch or brake mechanism having first and second parts relatively rotatable about an axis and to be selectively clutched together,
stationary coil means,
stator core means cooperating with said stationary coil means and having pole face means,
axially movable armature means mounted to be attracted to said pole face means upon energization of said coil means,
mechanical advantage means including a cam member moved by said armature means in a first axial direction,
a thrust body and a thrust member in said mechanical advantage means,
said thrust body and thrust member being relatively axially movable,
ball-receiving conical surface means between said thrust body and thrust member being progressively narrower in one generally radial direction,
thrust balls disposed between said thrust member and said thrust body ball-receiving conical surface means,
a longitudinally tapered cam surface on said cam member acting on said thrust balls to force said balls in said one generally radial direction upon movement of said cam member in said first axial direction to relatively move said thrust member and thrust body with a mechanical advantage,
and means connecting said first and second parts for relative movement to engage said mechanism upon energization of said coil means and consequent relative axial movement of said thrust body and thrust member.

13. In a clutch or brake mechanism having first and second parts relatively rotatable about an axis and to be selectively clutched together,
stationary coil means,
stator core means cooperating with said stationary coil means and having pole face means,
axially movable armature means mounted to be attracted to said pole face means upon energization of said coil means,
mechanical advantage means including a coaxial cam member moved by said armature means in a first axial direction,
a coaxial thrust body and a coaxial thrust member in in said mechanical advantage means,
said thrust body and thrust member being relatively axially movable,
ball-receiving conical surface means between said thrust body and thrust member being progressively narrower in one radial direction,
thrust balls disposed between said thrust member and said thrust body ball-receiving conical surface means,
a longitudinally tapered cam surface on said cam member acting on said thrust balls to force said balls in said one radial direction upon movement of said cam member in said first axial direction to relatively move said thrust member and thrust body with a mechanical advantage,
and means connecting said first and second parts for relative movement to engage said mechanism upon energization of said coil means and consequent relative axial movement of said thrust body and thrust member.

14. In a clutch or brake mechanism having first and second parts relatively rotatable about an axis and to be selectively clutched together,
coaxial stationary coil means,
stator core means partially surrounding said stationary coil means and having pole face means,
axially movable coaxial armature means cooperable with said coil means and with said stator core means to be attracted to said pole face means upon energization of said coil means,
a coaxial cam member moved by said armature means in a first axial direction,
a coaxial thrust body,
a coaxial thrust member,
said thrust body and thrust member being relatively axially movable,
ball-receiving conical surface means between said thrust body and thrust member being progressively narrower in one radial direction,
thrust balls disposed between said thrust member and said thrust body ball-receiving conical surface means,
a longitudinally tapered cam surface on said cam member acting on said thrust balls to force said balls in said one radial direction upon movement of said cam member in said first axial direction to relatively move said thrust member and thrust body with a mechanical advantage,
and means connecting said first and second parts for relative movement to engage said mechanism upon energization of said coil means and consequent relative axial movement of said thrust body and thrust member.

15. In a clutch or brake mechanism having first and second parts relatively rotatable about an axis and to be selectively clutched together,
coaxial stationary coil means,
stator core means partially surrounding said stationary coil means and having pole face means,
axially movable and non-rotative coaxial armature means cooperable with said coil means and with said stator core means to be attracted to said pole face means upon energization of said coil means,
a coaxial cam member moved by said armature means in a first direction,
a longitudinally stationary coaxial thrust body,
an axially movable coaxial thrust member,
ball-receiving conical surface means between said thrust body and thrust member being progressively narrower in one radial direction,
thrust balls disposed between said thrust member and said thrust body ball-receiving conical surface means,
a longitudinally tapered cam surface on said cam member acting on said thrust balls to force said balls in said one radial direction upon movement of said cam member in said first direction to move said thrust member with a mechanical advantage,
and means connecting said thrust member to move said first part toward said second part upon energization of said coil means to engage said mechanism.

16. In a clutch having first and second parts relatively rotatable about an axis and to be selectively clutched together,
  coaxial stationary coil means,
  stator core means partially surrounding said stationary coil means and having pole face means,
  axially movable and non-rotative coaxial armature means cooperable with said coil means and with said stator core means to be attracted to said pole face means upon energization of said coil means,
  a coaxial cam member moved by said armature means in a first direction,
  a longitudinally stationary coaxial thrust body,
  an axially movable coaxial thrust member,
  ball-receiving conical surface means between said thrust body and thrust member being progressively narrower radially inwardly,
  thrust balls disposed between said thrust member and said thrust body ball-receiving conical surface means and projecting radially outwardly beyond said thrust body and thrust member,
  a longitudinally tapered cam surface on said cam member overlying said thrust balls to force said balls inwardly upon movement of said cam member in said first direction to move said thrust member with a mechanical advantage,
  and means connecting said thrust member to move said first clutch part away from said coil means and toward said second clutch part upon energization of said coil means to engage said clutch.

17. In a clutch having first and second parts relatively rotatable about an axis and to be selectively clutched together,
  coaxial stationary coil means,
  stator core means partially surrounding said stationary coil means and having pole face means,
  axially movable and non-rotative coaxial armature mens cooperble with said coil means and with said stator core means to be attracted to said pole face means upon energization of said coil means,
  a coaxial cam member moved by said armature mens in a first direction,
  a longitudinally stationary and rotatable coaxial thrust body,
  a coaxial axially movable and rotatable thrust member,
  ball-receiving conical surface means between said thrust body and thrust member being progressively narrower radially inwardly,
  thrust balls disposed between said thrust member and said thrust body ball-receiving conical surface means and projecting radially outwardly beyond said thrust body and thrust member,
  a longitudinally tapered cam surface on said cam member overlying said thrust balls to force said balls inwardly upon movement of said cam member in said first direction to move said thrust member with a mechanical advantage,
  and means connecting said thrust member to move said first clutch part away from said coil means and toward said second clutch part upon energization of said coil means to engage said clutch.

18. In a clutch having first and second parts relatively rotatable about an axis and to be selectively clutched together,
  coaxial stationary coil means,
  stator core means partially surrounding said stationary coil means and having pole face means,
  axially movable and non-rotative coaxial armature means cooperable with said coil means and with said stator core means to be attracted to said pole face means upon energization of said coil means,
  a coaxial thrust bearing having first and second races, means connecting said armature to said first race to move said bearing toward said coil means,
  a rotatable coaxial cam member moved by said second race of said bearing,
  a longitudinally stationary and rotatable coaxial thrust body,
  a coaxial axially movable and rotatable thrust member,
  surfaces defining ball-receiving recesses in said thrust body and member,
  thrust balls disposed between said thrust member and said thrust body in said ball-receiving recesses and projecting radially outwardly beyond said thrust body and thrust member,
  said ball-receiving recesses being progressively narrower radially inwardly,
  a longitudinally tapered cam surface on said cam member overlying said thrust balls to force said balls inwardly upon movement of said cam member to axially move said thrust member with a mechanical advantage,
  and means connecting said thrust member to move said first clutch part away from said coil means and toward said second clutch part upon energization of said coil means to engage said clutch.

19. In a clutch having first and second parts relatively rotatable about an axis and to be selectively clutched together,
  a coaxial stationary coil,
  a first group of coaxial clutch plates non-rotatively connected to the first clutch part and movable along the axis,
  a second group of coaxial clutch plates non-rotatively connected to the second clutch part and movable along the axis,
  said first and second groups of plates being interleaved,
  a stator core partially surrounding said stationary coil and having pole faces,
  an axially movable and non-rotative coaxial armature cooperable with said coil and with said stator core to be attracted to said pole faces upon energization of said coil,
  a coaxial thrust bearing having first and second races, means connecting said armature to said first race to pull said bearing toward said coil,
  a rotatable coaxial cam member moved by said second race of said bearing toward said coil,
  a longitudinally stationary and rotatable coaxial thrust body,
  a coaxial axially movable and rotatable thrust member,
  surfaces defining ball-receiving recesses in said thrust body and member,
  thrust balls disposed betwen said thrust member and said thrust body in said ball-receiving recesses and projecting radially outwardly beyond said thrust body and thrust member,
  said ball-receiving recesses being progressively narrower radially inwardly,
  a longitudinally tapered cam surface on said cam member overlying said thrust balls to force said balls inwardly upon movement of said cam member toward said coil to move said thrust member with a mechanical advantage away from said coil,
  and means connecting said thrust member to move said first clutch part away from said coil and toward said second clutch part upon energization of said coil to engage said clutch plates.

20. In an electrically operated clutch or brake mechanism having non-rotative coil means and having first and second parts relatively rotatable about an axis and to be selectively clutched together,
  the provision of, armature means mounted to be moved in a first direction upon energization of the coil means,
  mechanical advantage means including a cam member moved by said armature means in a first axial direction,
  a thrust body and a thrust member in said mechanical advantage means, said thrust body and thrust member being relatively axially movable, conical surface means between said thrust body and thrust member being progressively narrower in one generally radial direction, rollable members disposed betwen said thrust member and said thrust body conical surface means, a longitudinally tapered cam surface on said cam member acting on said rollable members to force said rollable members in said one generally radial direction upon movement of said cam member in said first axial direction to relatively move said thrust member and thrust body with a mechanical advantage, and means connecting said first part for movement upon energization of the coil means and consequent relative axial movement of said thrust body and thrust member.

References Cited
UNITED STATES PATENTS

| | | | |
|---|---|---|---|
| 2,861,665 | 11/1958 | Passler | 192—84 |
| 2,937,729 | 5/1960 | Sperr | 192—84 |
| 3,138,232 | 6/1964 | Gerber et al. | 192—84 X |
| 3,157,260 | 11/1964 | Straub et al. | 192—84 |

MARK NEWMAN, *Primary Examiner.*

A. T. McKEON, *Examiner.*